United States Patent [19]

Jülke

[11] 4,352,606
[45] Oct. 5, 1982

[54] DEVICE FOR EXTRACTING HAY FROM A TOWER SILO

[75] Inventor: Bernhard Jülke, Melle, Fed. Rep. of Germany

[73] Assignee: Engelbrecht & Lemmerbrock GmbH & Co., Melle, Fed. Rep. of Germany

[21] Appl. No.: 158,718

[22] Filed: Jun. 12, 1980

[30] Foreign Application Priority Data

Jun. 19, 1979 [DE] Fed. Rep. of Germany ....... 2924558

[51] Int. Cl.³ .............................................. B65G 53/44
[52] U.S. Cl. ..................................... 406/81; 406/114
[58] Field of Search ....................... 406/56, 57, 79, 80, 406/81, 113, 114, 115, 116; 414/313, 318, 319, 320, 321

[56] References Cited

U.S. PATENT DOCUMENTS 4,057,295 11/1977 Liet et al. ............................... 406/52

OTHER PUBLICATIONS

NEUERO Bovenlosser/verdeler AS 50 tot 80.

*Primary Examiner*—Jeffrey V. Nase
*Attorney, Agent, or Firm*—Balogh, Osann, Kramer, Dvorak, Genova & Traub

[57] ABSTRACT

This invention relates to devices for extracting hay or the like from a cylindrical tower silo, of the kind including a pneumatic conveyor pipe leading centrally into the silo and forming an inlet at its upper end, the conveyor pipe having a suction head to which the material is fed by means of a radial conveyor. According to this invention, a portion of the conveyor pipe which follows the top end inlet into the silo extends radially with respect to the periphery of the silo and is rotatable around the axis of the silo. The free extremity of the conveyor pipe radial portion is associated with the suction head, to which the material is fed by means of the radial conveyor which conveys from the inside the silo towards the outside thereof, and also revolves around the silo axis. A vertical telescopic pipe may connect the further conveyor pipe radial portion to the top end inlet.

9 Claims, 4 Drawing Figures

DEVICE FOR EXTRACTING HAY FROM A TOWER SILO

BACKGROUND OF THE INVENTION

The present invention relates to devices for extracting hay or the like from a cylindrical tower silo. The devices are of the kind including a pneumatic conveyor pipe leading centrally into the silo at its upper end, the duct having a suction head to which the material is fed by means of a radial conveyor. Hereinafter, such devices will be referred to as "of the kind described".

In known devices of the kind described, a pneumatic conveyor pipe leads centrally into the circular tower silo and provided with an inlet at its upper end and may be extended and contracted as a telescopic pipe within the silo. The conveyor pipe terminates above the surface of the material in the silo in a suction head to which the material is fed by a conveyor device working outwards from the inside and driven in rotation around the axis of the silo. A system is also known wherein the suction head is allowed to revolve at a distance from the silo axis and around the latter by virtue of a bottom cranked portion of the axial telescopic pipe, in which case the suction head has the material conveyed to it partially from the outside towards the inside and partially from the centre towards the radius of revolution.

In circular tower silos ventable upwards from below, which are loaded with hay (which may be shrivelled or withered), three-quarters of the quantity of material is present between the circle at half the silo radius and the silo periphery, and no more than a quarter of the quantity of material is situated between the axis of the silo and the circle at half the silo radius.

The result is that a conveying operation from the outside towards the inside to the suction head, affecting the large quantities of material situated along the outer annular area of the silo, requires considerable conveying distances.

Consequently, it is an object of the invention to keep the conveying distances for the material which is to be extracted, to the suction head of the pneumatic conveyor duct, to a minimum.

SUMMARY OF THE INVENTION

To achieve this and other objects, in a device of the kind described the invention consists in that the top inlet of the conveyor pipe leading into the top end of the silo is followed by a a portion of the conveyor pipe which extends radially with respect to the periphery of the silo and is rotatable around the axis of the silo. The free extremity of the conveyor pipe inner or radial portion is associated with its suction head, to which the material is fed by means of the radial conveyor which conveys from the inside of the silo towards the outside thereof and also revolves around the silo axis.

A vertical telescopic pipe preferably connects the conveyor pipe inner or radial portion to the top end inlet. During the rotation of the suction head along the inner side of the silo wall. Only short conveying distances (at a lesser power rating of the conveyor applied) are required for conveying the larger quantities of material. This feature is particularly advantageous for extracting long-stalked dried hay.

The extraction device may complementarily be applied to load the silo with hay, air-dried hay or the like. This is feasible by virtue of the fact that the vertical telescopic pipe extending along the inner peripheral side of the silo may be uncoupled from the radial portion of the conveying pipe and contracted, and that the conveying direction of the conveyor is reversed, or by the fact that in case of connection to the central vertical telescopic pipe the radial portion of the conveying pipe is a telescopic pipe whose end may be uncoupled from the suction head, and fitted with a deflector surface or a distributor head. Distributor heads of this nature were described, for example, in the German Patent Specification No. 2,103,409.

BRIEF DESCRIPTION OF THE DRAWINGS

In order that the invention may be more clearly understood, reference will now be made to the accompanying drawings which diagrammatically illustrate two embodiments thereof and in which.

DETAILED DESCRIPTION OF PREFERRED EMBODIMENTS

Figure 1:
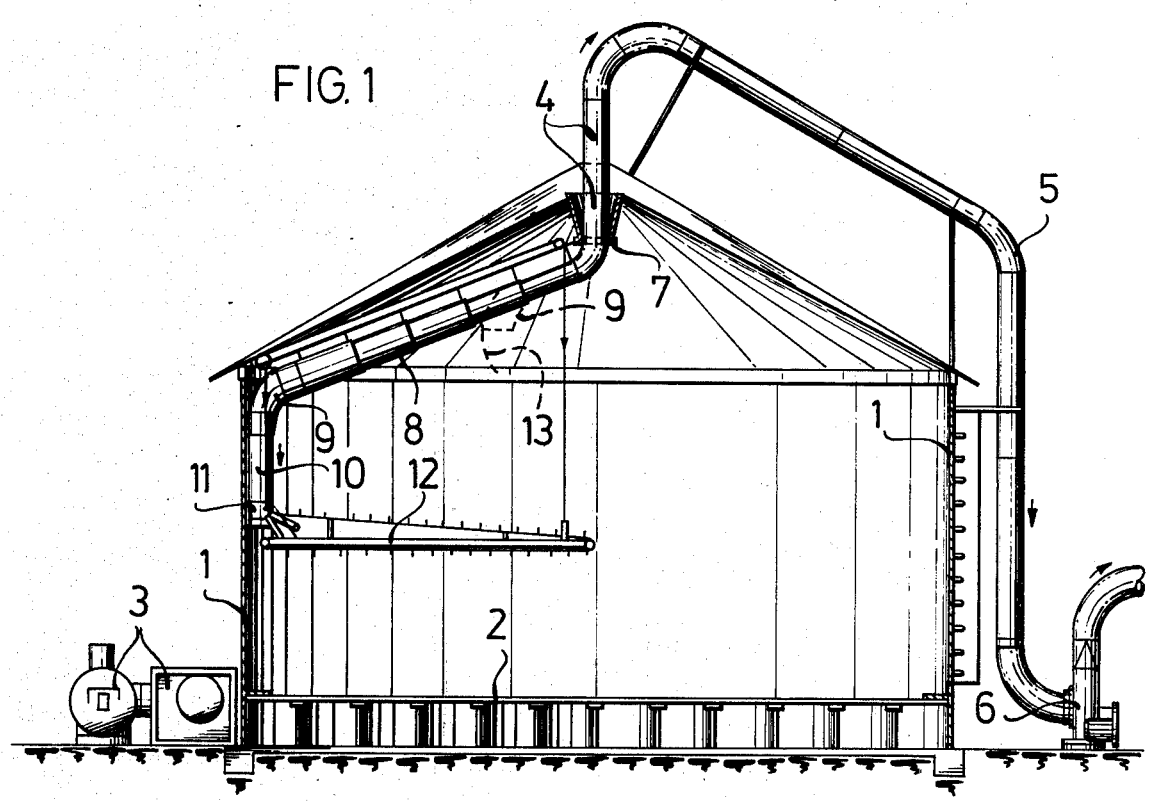
FIG. 1 shows an axial section through a tower silo comprising a first embodiment of pneumatic extraction device and FIG. 2 shows an axial section through a second embodiment.

Referring now to the drawings, FIG. 1 shows a round tower silo 1 for hay, air-dried hay or the like, whereof the charge of material may be vented or ventilated with cold or warm air, from the base to the top. To this end, an intermediate floor or partition 2 is incorporated, comprising a slatted grid bearing a convering of steel fabric or mat (See FIGS. 2-4). Air is fed to the space below this intermediate floor or slatted grid by means of a blower 3 and a heat exchanger.

An inlet 4 of a conveying pipe 5 which is connected to a suction-pressure blower 6, is present at the centre at the top of the silo.

The inlet 4 has connected to it a portion of the conveyor pipe 8 which is radial, and rotarily entrainable around the silo axis, e.g. by being journalled at 7, which merges via an elbow pipe 9 close to the silo wall into a vertical telescopic conveyor pipe 10 comprising a suction head 11 and displaceable by means of a driving system. The suction head 11 is supplied with the dry hay present in the silo from its surface, by means of a belt or chain conveyor 12 or of a drag-chain conveyor, outwards from the axis of the silo. This conveyor 12 equally turns around the silo axis with the radial portion of the conveyor pipe 8, under appropriate suspension, and is provided with any conventional drive means which is not shown.

Due to the rotation of the pipes 8, 9, 10, 11 with the conveyor 12, the hay is taken off the surface of the material and conveyed to the suction head along the shortest conveying path, and is then supplied to a feeding station, for example, via the conveying pipe 5 and the blower 6. The rotation around the silo axis occurs in such manner that approximately half a revolution is made per minute, the speed of circulation of the endless conveyor belt 12 being greater than the speed of revolution of the suction head 11.

Figure 2:
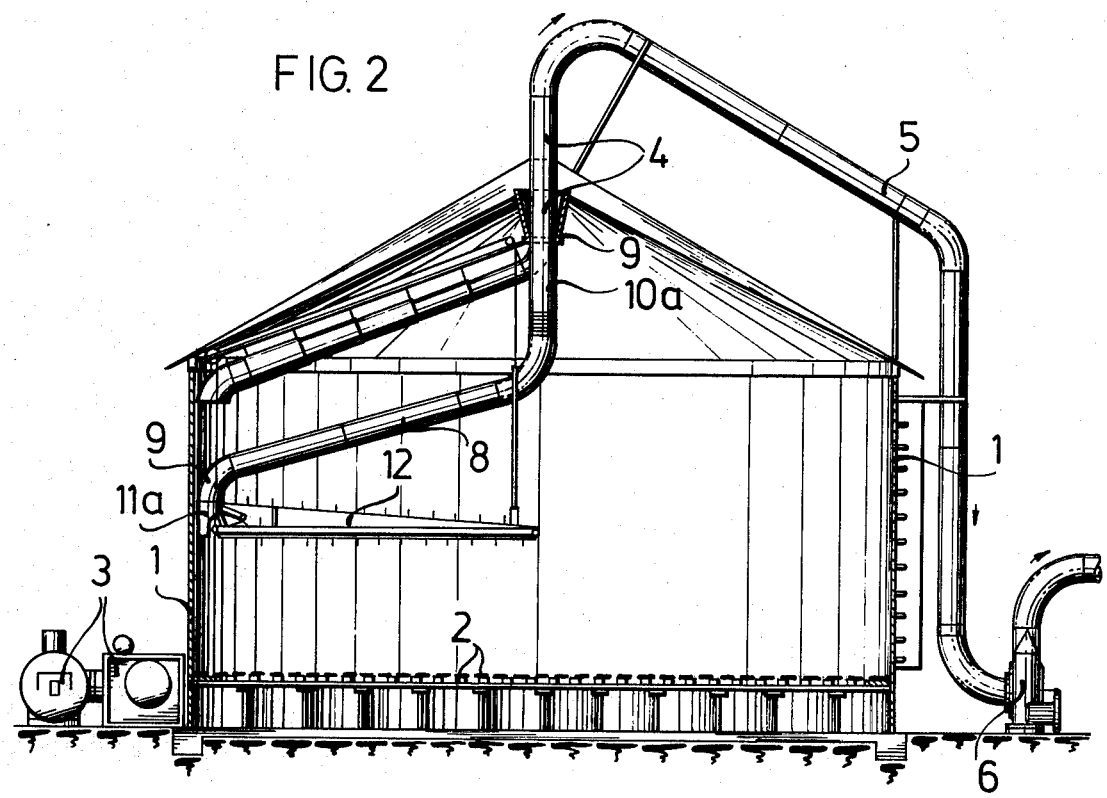
Figure 3:
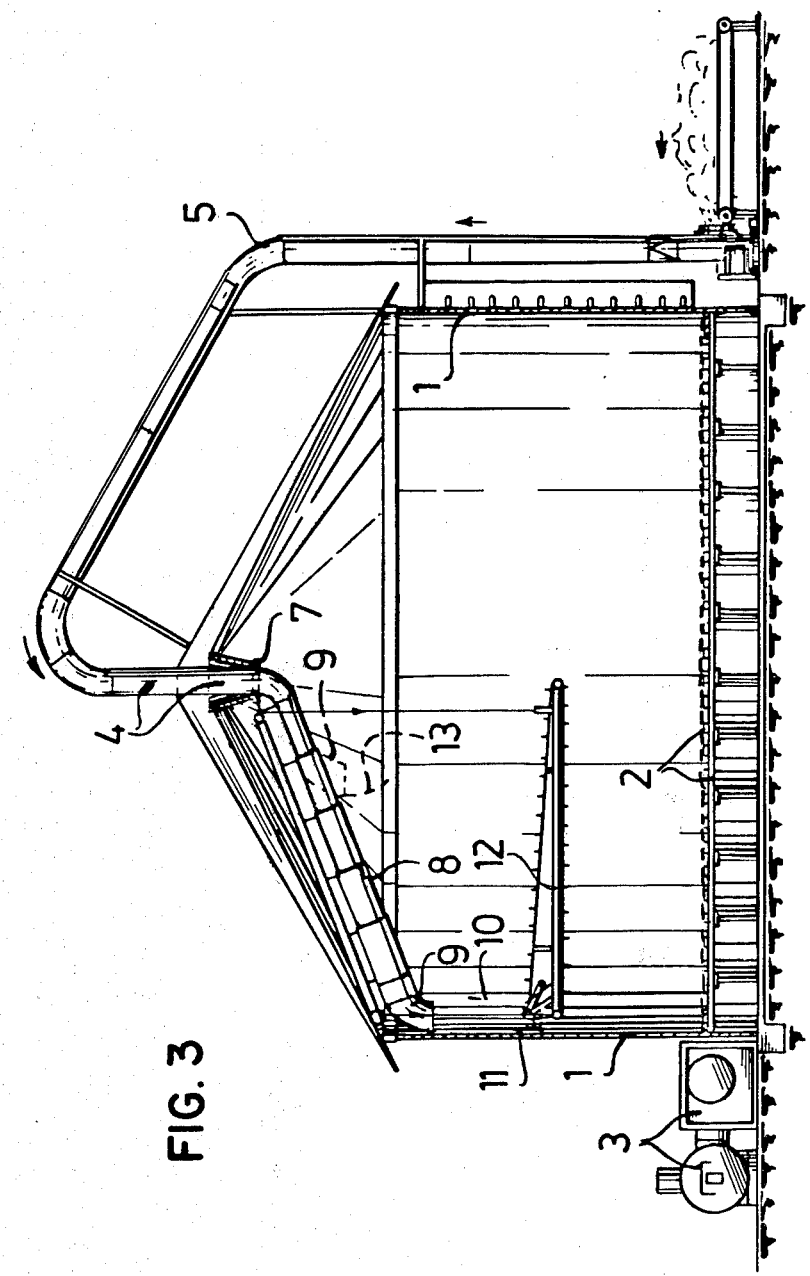
FIG. 3 shows an axial section through a third embodiment of the invention including charging means.
Figure 4:
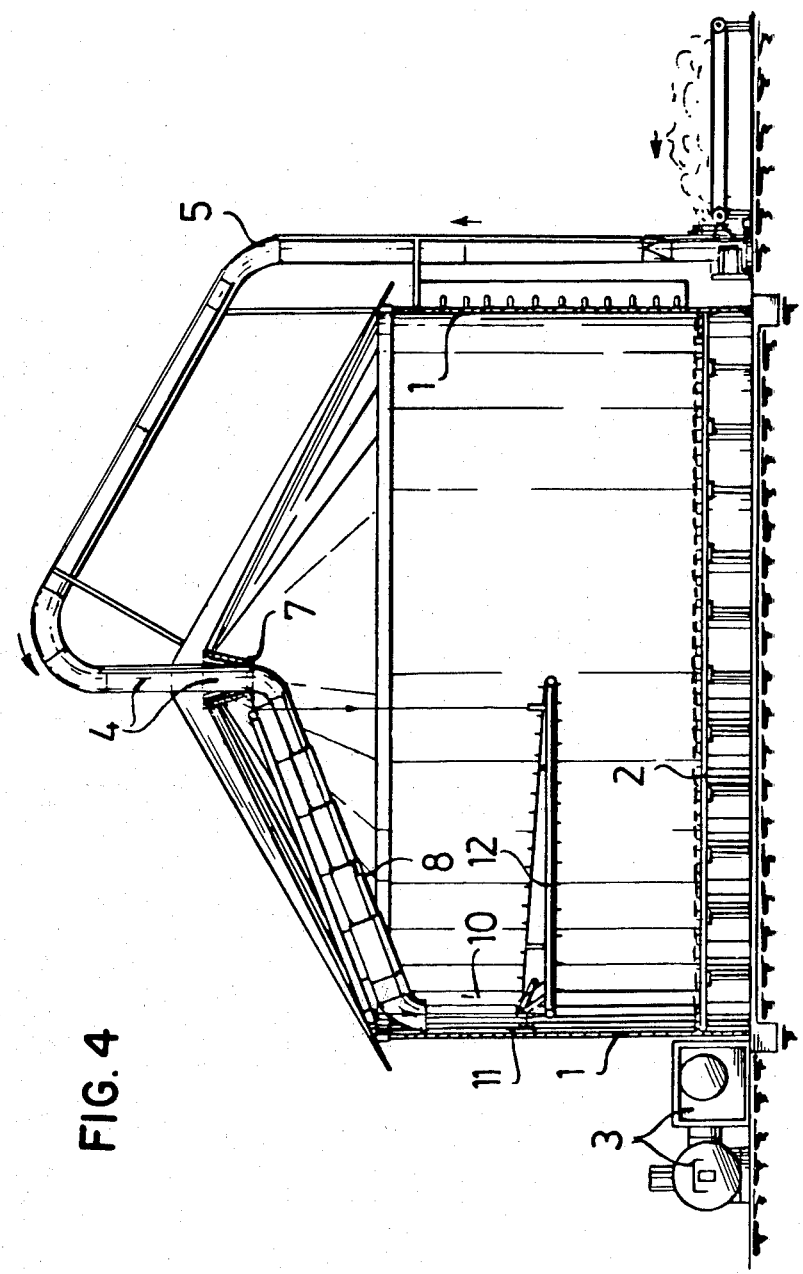
FIG. 4 shows an axial section through a fourth embodiment of the invention including charging means.

As shown in FIGS. 3 and 4, the aforesaid plant may be utilised without alteration even for loading the silo with hay, air-dried hay or the like. FIGS. 3 and 4 illustrate the charging means (charging is indicated by arrows). During the charging, the radial conveying pipe 8 of FIG. 2 is uncoupled and a telescopic pipe 8 as shown in FIGS. 3 and 4 is connected to the top end inlet 4. (This is shown also in FIG. 2 by dotted lines beneath elbow pipe 9.) To this end, after the conveying pipes have been changed appropriately at the blower 6, the vertical telescopic conveyor pipe 10 is disconnected below the elbow pipe 9 and collapsed. Hay or the like is then fed in by a blower via the conveying pipe 5 and the radial portion of the conveying pump 8, which emerges from the elbow pipe 9, the belt conveyor 12 having its direction of revolution reversed, so that the hay supplied is distributed over the silo area during rotary circulation of the radial conveying pipe 8 and of the conveyor 12. In this case, the radial conveying pipe 8 may also be a telescopic pipe comprising a drive for its contraction and extension, so that apart from its rotation, the elbow pipe 9 may also perform a radial displacement to obtain an even distribution of the hay over the silo area. The elbow pipe 9 may also have connected to it a deflector surface 13 (shown dash-dotted) or else a distributor head, e.g. as described in German Patent Specification No. 2,103,409.

It will be understood that the silo charge is limited by the vertical telescopic pipe 10 at the periphery of the silo, since this telescopic pipe 10 also requires a particular height above the surface of the material within the silo, even in the collapsed state. For this reason, and in accordance with the embodiment shown in FIG. 2, the procedure applied is that the suction head 11a is connected direct to the elbow pipe 9. The vertical displacement of the radial conveying pipe 8 with the conveyor, e.g. a belt or chain conveyor 12, is then performed by a telescopic pipe denoted by 10a and lying in the vertical axis of the silo, which may also project outwards through the silo roof. The height below the roof ridge which is not valorisable for the silo load, or else the height above the roof, is thereby exploited and the loading of the silo may now be carried on farther than in the embodiment according to FIG. 1.

In the case of FIG. 2, the extraction device may also be co-opted for loading the silo with hay or air-dried hay, by disconnecting the suction head 11a and conveyor 12 under reversal of its direction of circulation from the elbow pipe 9 and then utilising the elbow pipe 9 as an outlet which may be complemented in the manner depicted in FIG. 1 by deflector surfaces or distributor heads.

I claim:
1. In a device for extracting hay or the like from a cylindrical tower silo, the device being of the type comprising a pneumatic conveyor pipe leading centrally into said silo at its top end, and provided with an inlet thereat, and having a suction head for receiving material therein, and a radial belt or chain conveyor disposed in said silo, for feeding the material to said suction head of said conveyor pipe, the improvement comprising said conveyor pipe having a portion which extends radially with respect to the periphery of the silo, and is rotatable around the axis of the silo, said radial portion of said conveyor pipe having one extremity thereof following said top end inlet and the other extremity thereof being associated with said suction head, and said radial belt or chain conveyor revolves around the silo axis and feeds material to said suction head by conveying the material from the inside of the silo towards the outside thereof.

2. A device according to claim 1, wherein a vertical telescopic pipe connects said radial portion of said conveyor pipe to said top end inlet.

3. A device according to claim 1, wherein the other extremity of said radial portion of said conveyor pipe is connected to said suction head via a vertical telescopic pipe.

4. A device according to claim 1, wherein the other extremity of said radial portion of said conveyor pipe is connected to said suction head.

5. A device according to claim 2, wherein said tower silo is ventable upwards from below, and said vertical telescopic pipe extends in the center of said silo, and further comprising means for charging said silo, said charging means comprise said vertical telescopic pipe being collapsable telescopically, and disconnectable from said conveyor pipe, and said radial belt or chain conveyor being reversible in its conveying direction so as to distribute material fed by said conveyor pipe, over said silo area.

6. A device according to claim 5, wherein said charging means comprise said radial portion of said conveying pipe being a telescopic pipe having an extremity which is uncouplable from said suction head and being provided with a deflector surface.

7. A device according to claim 5, wherein said charging means comprise said radial portion of said conveying pipe being a telescopic pipe having an extremity which is uncouplable from said suction head and being provided with a distributor head.

8. A device according to claim 5, wherein said charging means comprise a short pipe having an outflow means being connected to said vertical telescopic pipe.

9. A device according to claim 1, wherein the conveying speed of said radial belt or chain conveyor from the inside towards the outside is selected to be greater than the speed of revolution of said suction head.

* * * * *